United States Patent [19]
Furuhata

[11] Patent Number: 5,473,586
[45] Date of Patent: Dec. 5, 1995

[54] OPTICAL PICKUP FOR AN OPTICAL DISC

[75] Inventor: Hitoshi Furuhata, Saitama, Japan

[73] Assignee: Pioneer Electronic Corporation, Tokyo, Japan

[21] Appl. No.: 305,419

[22] Filed: Sep. 13, 1994

Related U.S. Application Data

[63] Continuation of Ser. No. 957,129, Oct. 7, 1992, abandoned.

[30] Foreign Application Priority Data

Feb. 28, 1992 [JP] Japan ..................................... 4-078487

[51] Int. Cl.$^6$ ................................................. G11B 7/13
[52] U.S. Cl. .................................. 369/44.23; 369/44.41; 369/112
[58] Field of Search ............................ 369/44.23, 44.41, 369/44.28, 44.25, 112, 110, 44.42, 44.32, 44.24

[56] References Cited

U.S. PATENT DOCUMENTS

| | | | |
|---|---|---|---|
| 5,084,850 | 1/1992 | Yanagawa et al. | 369/44.41 |
| 5,113,386 | 5/1992 | Whitehead et al. | 369/44.42 X |

*Primary Examiner*—Georgia Y. Epps
*Assistant Examiner*—Muhammad N. Edun
*Attorney, Agent, or Firm*—Nikaido, Marmelstein, Murray & Oram

[57] ABSTRACT

An optical pickup is adapted to be operated in accordance with a tracking error signal obtained by a push-pull method. The pickup has a photodetector including a pair of detector elements disposed side by side. An astigmatizer is disposed on an axis of a light beam reflected from an optical disc for producing an astigmatic beam. The photodetector is positioned outside a point where a spot of the astigmatic beam becomes a circular shape, and a boundary line between the two detector elements is disposed on a line along which the spot moves in a tracking operation.

2 Claims, 5 Drawing Sheets

TRACKING ERROR SIGNAL

OPTICAL PICKUP FOR AN OPTICAL DISC

This application is a continuation of application Ser. No. 07/957,129 filed Oct. 7, 1992 now abandoned.

FIELD OF THE INVENTION

The present invention relates to an optical pickup for an optical disc such as a CD, and more particularly to a system for deriving a tracking error signal in accordance with a push-pull method.

BACKGROUND OF THE INVENTION

The push-pull method is one of the methods for deriving a tracking error signal. Referring to FIGS. 8a to 8c, the push-pull method uses change in distribution of energy in a beam spot which is caused by light diffracted and reflected by a pit P on a disc D when a laser beams is deflected from a track of the disc. When the laser beam is properly centralized on the track, the light is equally diffracted to the right diffracted light and the left diffracted light as shown in FIG. 8b. Thus energy is equally distributed. On the other hand, if the tracking is off-center as shown in FIGS. 8a and 8c, the beam is asymmetrically diffracted. By obtaining the difference between the distributions of energy, it can be determined the direction in which the beam is deflected from the track.

Referring to FIG. 9, a conventional track-following servo system using the push-pull method has a photodetector 4 for detecting a spot S of the reflected beam. The photodetector 4 has two detecting areas 2 and 3 which are defined by a central boundary line 1 in the tangential direction of the disc. The spot S of the reflected beam has a shadow shown by a hatched area in FIG. 9 on each of the detecting areas 2 and 3. The outputs of the detecting areas are applied to a differential amplifier 5 which applies a positive or negative tracking error signal to a track-following servo circuit 6. The circuit 6 operates an actuator 7 for positioning the optical pickup to render the difference of the outputs of the detecting areas 2 and 3 zero.

The outputs of the photodetector 4 are further applied to a summing amplifier 9 to produce an RF signal.

If the track on the disc is properly followed, diffracting the beam as shown in FIG. 8b, the shadows in the spot formed on the detecting areas 2 and 3 have the same area so that the difference between the outputs is zero. If the beam is deflected to the left of the pit, thereby giving a diffraction shown in FIG. 8a, the shadow in the spot on the detecting area 2 is smaller than the shadow on the detecting area 3. To the contrary, if the beam is deflected to the right, so that the beam diffracts as shown in FIG. 8c, the shadow in the spot of area 3 becomes smaller than the shadow on the area 2. Thus a difference is obtained by the differential amplifier 5, thereby applying a tracking error signal to the track-following servo circuit 6. As a result, the actuator 7 is operated to control the error to zero.

In the push-pull method, when the axis of the laser beam is not vertical to the recording surface of the disc, or the objective is moved, or the axis of the laser beam is deflected upon the track-following operation, the spot of the reflected beam moves in the direction perpendicular to the center line 1. Consequently, the distribution of the energy of the spot received by the detecting areas 2 and 3 changes, thereby causing the tracking error signal to have a DC offset. The track-following servo circuit 6 is operated in accordance with the erroneously offset tracking error signal so that the beam is further deflected from the track.

In order to reduce the DC offset, a part of the photodetector 4 is masked to render the size of the detecting areas 2 and 3 smaller than the spot as shown by a reference M in FIG. 9. Elliptic masks M1 and M2 may be provided as shown in FIG. 10.

However, since each mask must be designed to conform with the reflected beam, which is very small, it is difficult to provide an appropriate mask. Furthermore, the spot size of the light beam must be adjusted in accordance with the mask, which is also quite difficult. In addition, the masking method can not perfectly prevent the DC offset.

SUMMARY OF THE INVENTION

An object of the present invention is to provide an optical pickup wherein a spot of a beam to be moved on a photodetector is moved in a direction which does not affect a tracking error signal, thereby providing a reliable tracking error signal.

According to the present invention, there is provided an optical pickup adapted to be operated in accordance with a tracking error signal obtained by a push-pull method, wherein the pickup has a photodetector comprising a pair of detector elements disposed side by side, and an astigmatizer disposed on an axis of a light beam reflected from an optical disc for producing an astigmatic beam.

The photodetector is positioned outside a point where a spot of the astigmatic beam becomes a circular shape, and boundary line between the two detector elements is disposed on a line along which the spot moves in a tracking operation.

Thus, the photodetector receives a beam spot caused by the reflected light beam which is rotated 90 degrees by the astigmatizer. When the axis of the light beam focused on the disc is tilted upon tracking, the beam spot moves along the boundary line between the detector elements. Since the relative difference between the sizes of the spot detected by the detector elements do not change, an accurate tracking error signal is produced.

The other objects and features of this invention will become understood from the following description with reference to the accompanying drawings.

DETAILED DESCRIPTION OF THE PREFERRED EMBODIMENTS

Figure 1:
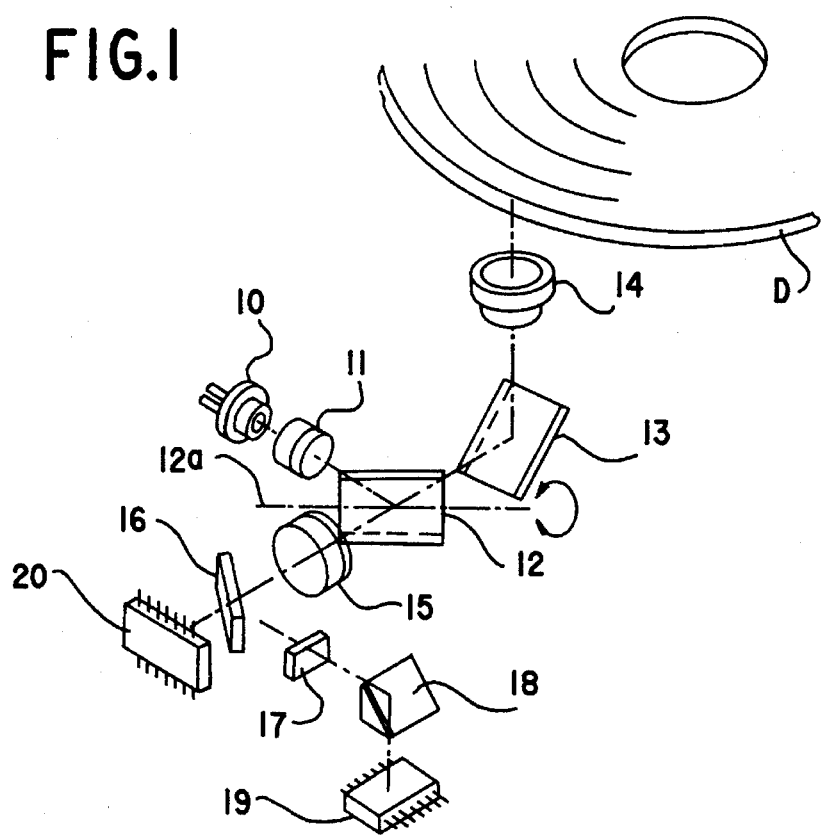
FIG. 1 is a schematic diagram of an optical pickup of the present invention.

Referring to FIG. 1, an optical pickup to which the present invention is applied has a semiconductor laser device 10 which emits a laser beam. The laser beam is collimated by a collimator lens 11 and transmitted in a direction parallel to an optical disc D by a galvano-mirror 12, which also serves as a beam splitter. The laser beam is further reflected on a prism mirror 13, thereby focusing on the recording surface of the disc D through an objective 14. The galvano-mirror 12 is adapted to be rotated about an axis 12a thereof in a track-following operation.

The beam reflected on the recording surface of the disc D is transmitted to a photodetector 20 of a track-following servo system through the objective 14, prism mirror 13, galvano-mirror 12, convex lens 15 and an astigmatizer 16. The astigmatizer 16 is formed by inclining a glass plate so as to produce an astigmatic pencil of rays. The reflected beam is further reflected to a photodetector 19 of a focusing servo system by the astigmatizer 16, passing through a half-wave plate 17 and a beam splitter 18.

Figure 2:
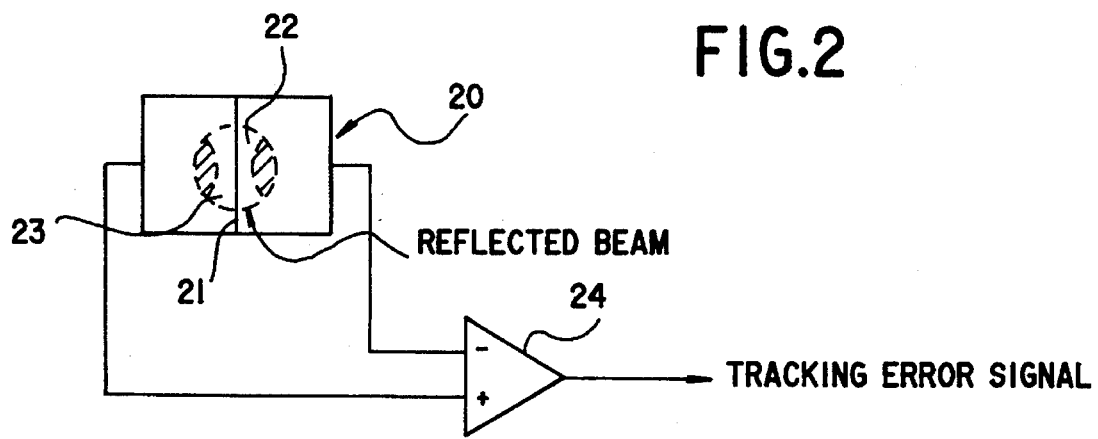
FIG. 2 is a block diagram of a track-following servo system of the pickup of FIG. 1.

As shown in FIG. 2, the photodetector 20 has a pair of rectangular detector elements 22 and 23 divided by a boundary line 21. Each of the detector elements 22 and 23 of the photodetector 20 produces an output proportional to the area of a shadow shown by a hatched area in the figure. The outputs are fed to a differential amplifier 24 which generates a tracking error signal based on the difference between the outputs. The tracking error signal is applied to a track-following servo circuit (not shown), thereby rotating the galvano-mirror 12 so as to cause the difference to go to zero.

Figure 3:
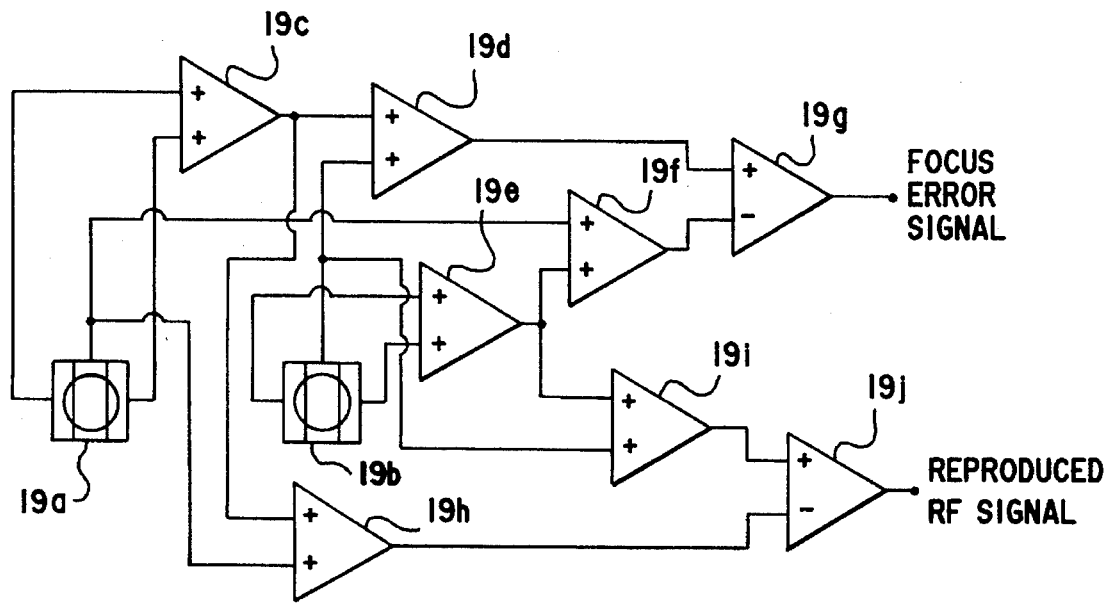
FIG. 3 is a block diagram of a focus servo System of the pickup of FIG. 1.

Referring to FIG. 3, the photodetector 19 for the focusing servo comprises a pair of detector elements 19a and 19b, each of which is divided into three portions so as to obtain a focus error signal in accordance with a spot size method. The outputs of the side portions of the first detector elements 19a are added by a summing amplifier 19c and the sum thereof is added to the output of the central portion of the second detector element 19b by a summing amplifier 19d. The output of the central portion of the first detector element 19a and the sum of outputs of the side portions of the second detector elements 19b obtained by a summing amplifier 19e are added by a summing amplifier 19f. The output of the summing amplifiers 19d and 19f are fed to a differential amplifier 19g so as to produce a focus error signal. The focus error signal is applied to a focus servo circuit (not shown) thereby operating the pickup to render the output of the differential amplifier 19g zero.

The outputs of the central portion of the first detector element 19a and the summing amplifier 19c are added together at a summing amplifier 19h, and the outputs of the central portion of the second detector element 19b and the summing amplifier 19e are added by a summing amplifier 19i. The outputs of the summing amplifiers 19h and 19i are applied to a differential amplifier 19j to produce an RF signal.

Figure 4:
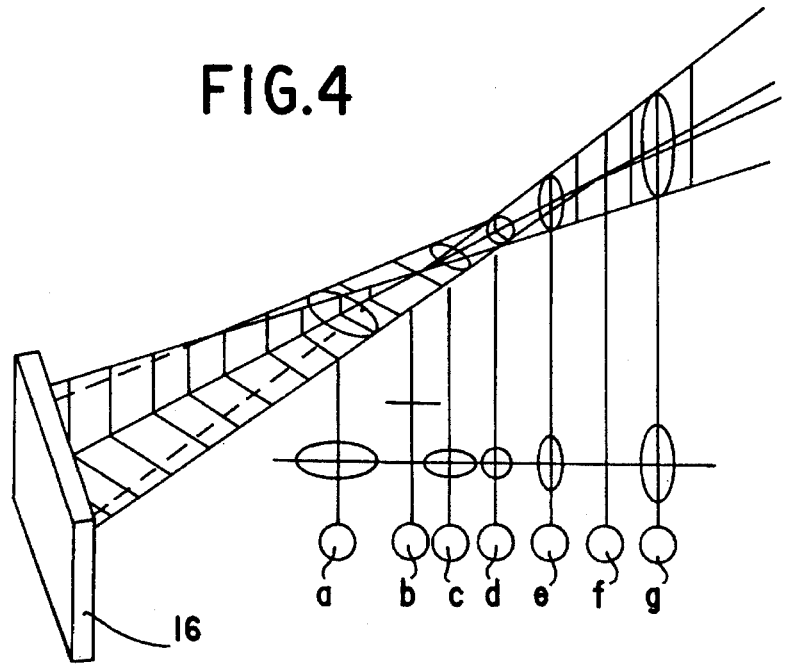
FIG. 4 is a diagram explaining the operation of an astigmatizer provided in the pickup of FIG. 1.

The track-following servo system of the present invention uses an astigmatic method, which is described in detail with reference to FIG. 4. Upon passing through the astigmatizer 16, the reflected beam is formed into an astigmatic beam (pencil of rays), so that the sectional shape of the pencil of rays is changed as shown in FIG. 4. The astigmatic pencil of rays forms a laterally elongated elliptic sectional shape at a point a and becomes a horizontal line at a second focal point b. The beam is gradually vertically diffused to form an elongated ellipse at a point c and a circle at a point d. The sectional shape of the pencil is gradually narrowed to form a vertically elongated ellipse at a point e, and further a vertical line at a first focal point f. The beam is then widened, thereby forming a vertically elongated ellipse at a point g.

The detector elements 22 and 23 of the photodetector 20 are disposed at the point e, which is further away from the astigmatizer 16 than the point d where the spot forms a circular shape. Thus, the spot of laser beam formed on the photodetector 20 is displaced roughly 90 degrees by the astigmatizer 16 from the original beam. Moreover, the photodetector 20 is so disposed that the beam spot moves along the boundary line 21 when the galvano-mirror 12 is rotated during a track-following operation. More particularly, the galvano-mirror 12 is rotated to centralize the laser beam on the track in the track-following servo operation. Since the spot moves along the boundary line 21 of the photodetector 20, the relative quantities of light detected by the detector elements 22 and 23 do not change. Thus, the tracking error signal is not affected.

In addition, in the focus servo system, the beam spots move in parallel to the boundary lines of the detector elements 19a and 19b when the galvano-mirror 12 is rotated. Hence the relative quantities of light detected by the elements do not change, so that an accurate focus error signal is obtained.

Figure 5:
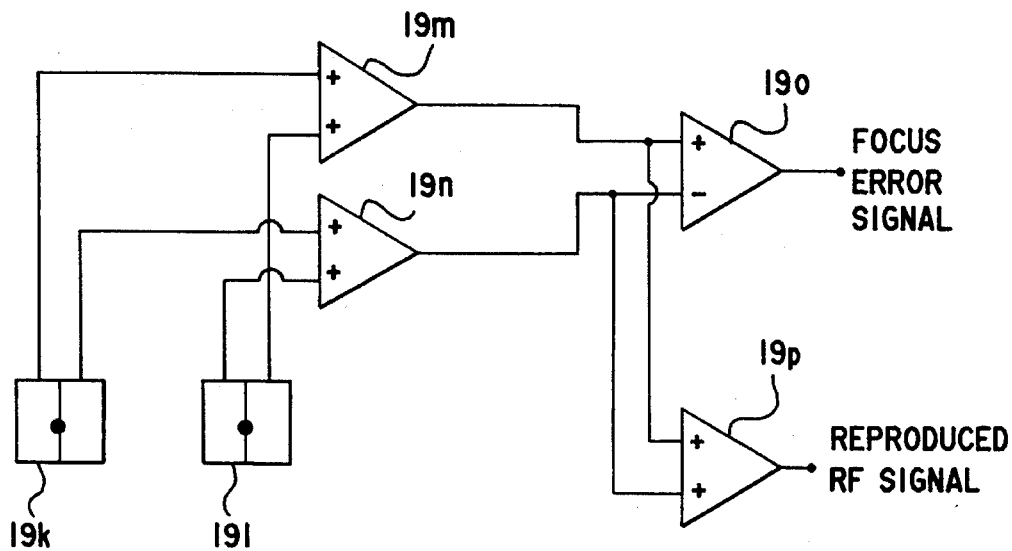
FIG. 5 is a block diagram of another example of a focus servo system of the pickup of FIG. 1.

The present invention may be applied to an optical system of a pickup using Foucault focusing method. Referring to FIG. 5, the photodetector 19 has a pair of detector elements 19k and 19l, each of which is divided into two portions. One of the outputs of each detector element 19k (19l) is applied to a summing amplifier 19m and the output of the other portion to a summing amplifier 19n. The outputs of the summing amplifiers 19m and 19n are applied to differential amplifier 19o to produce a focus error signal. The outputs of the summing amplifiers 19m and 19n are further fed to a summing amplifier 19p to produce an RF signal. When the galvano-mirror 12 is rotated, each spot moves along the boundary line of the detector elements 19k and 19l without affecting the relative size of the spots. Thus, an accurate focus error signal is produced. Alternatively, the knife edge focusing servo method may be used.

Figure 6A:
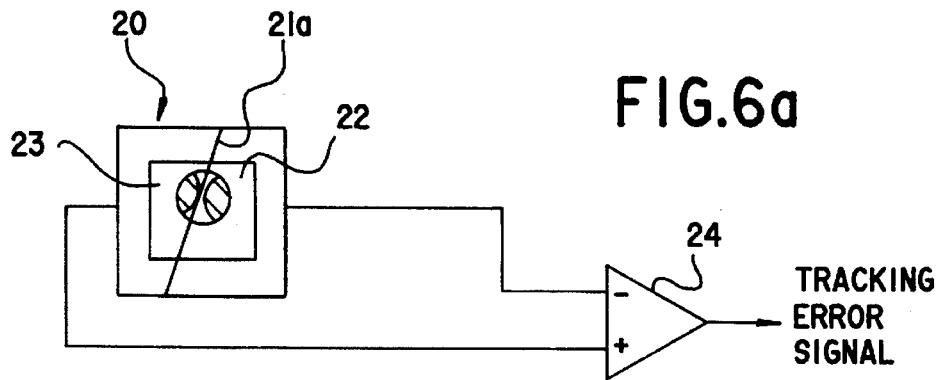
FIGS. 6a, 6b and 7 show block diagram of other embodiments of the present invention.
Figure 6B:
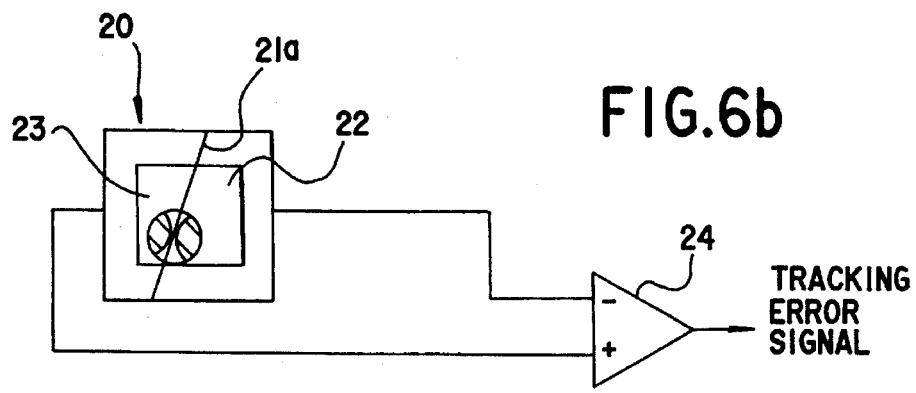

Referring to FIGS. 6a and 6b, in the second embodiment of the present invention, the detector elements 22 and 23 of the photodetector 20 are defined by an oblique line 21a. The reason for thus forming the photodetector 20 is that, when the galvano-mirror 12 is rotated, the beam spot not only moves vertically but also laterally, namely obliquely. Hence, when the photodetector 20 is divided by the line 21a, the offset can be further reduced, thereby producing a more accurate tracking error signal.

Figure 7:
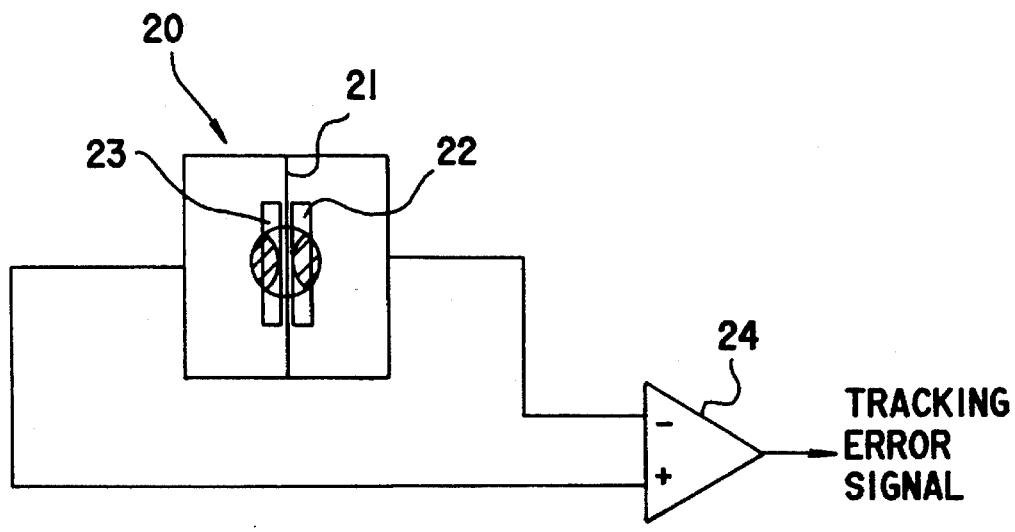
Figure 8A:
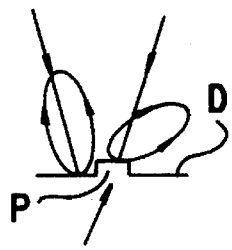
FIGS. 8a to 8c are diagrams for explaining the principle for deriving a tracking error signal in accordance with the push-pull method.
Figure 8B:
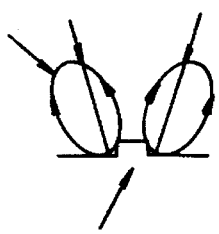
Figure 8C:
Figure 9:
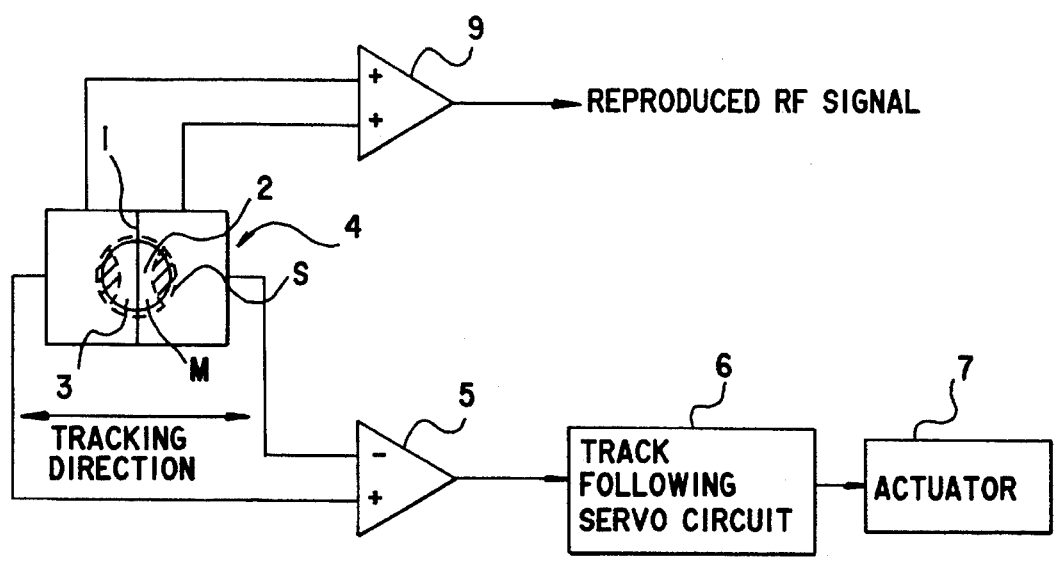
FIGS. 9 and 10 are block diagrams of conventional track-following servo systems.
Figure 10:
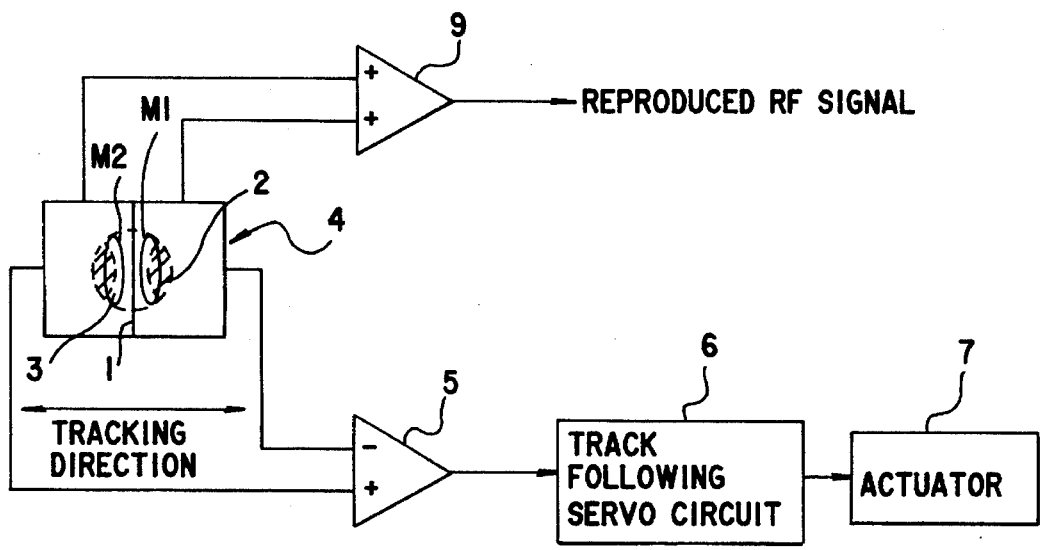

Referring to FIG. 7, in the third embodiment of the present invention, the detector elements 22 and 23 which are divided by the vertical boundary line 21 are masked so that the detecting surfaces thereof are reduced thereby forming a pair of vertically elongated rectangles. Since the size of the beam spot detected by the elements 22 and 23 is reduced, the fluctuation thereof becomes small. Consequently, the change in intensity of the beam spot is restrained so that the offset hardly affects the tracking error signal.

In accordance with a pickup of the present invention, a photodetector is provided outside of a point where the spot of the beam becomes a circular shape so that the reflected beam is inverted 90 degrees. The photodetector is bisected by a boundary line along which a beam spot moves when the angle of the axis of a laser beam radiating on the disc changes. Hence, an accurate tracking error signal is obtained.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. An optical pickup for an optical disc, the pickup having a photodetector including a pair of detector elements disposed side by side, said optical pickup comprising:

an astigmatizer disposed on an axis of a light beam reflected from the optical disc for producing an astigmatic beam;

wherein the photodetector being positioned outside a point where a spot of the astigmatic beam becomes a circular shape, and wherein a boundary line, between the said pair of detector elements, is disposed on a line along which the spot moves during a tracking operation.

2. An optical pickup according to claim 1, wherein the astigmatizer is a glass plate disposed to be inclined with respect to the axis of the light beam.

* * * * *